United States Patent
Nagata et al.

(10) Patent No.: US 7,333,693 B2
(45) Date of Patent: Feb. 19, 2008

(54) OPTICAL TAP MODULE

(75) Inventors: Hisao Nagata, Tokyo (JP); Hideki Hashizume, Tokyo (JP); Akimitsu Sato, Somerset, NJ (US)

(73) Assignee: Nippon Sheet Glass Co., Ltd., Tokyo (JP)

( * ) Notice: Subject to any disclaimer, the term of this patent is extended or adjusted under 35 U.S.C. 154(b) by 86 days.

(21) Appl. No.: 11/354,932

(22) Filed: Feb. 16, 2006

(65) Prior Publication Data

US 2007/0189670 A1    Aug. 16, 2007

(51) Int. Cl.
*G02B 6/32*    (2006.01)
(52) U.S. Cl. .............................. 385/48; 385/33; 385/34
(58) Field of Classification Search .................. None
See application file for complete search history.

(56) References Cited

U.S. PATENT DOCUMENTS

| | | | | |
|---|---|---|---|---|
| 6,895,144 | B2 * | 5/2005 | Shi | ............................... 385/33 |
| 2004/0114932 | A1 | 6/2004 | Tanaka et al. | |
| 2004/0179789 | A1 * | 9/2004 | Shi | ............................... 385/88 |
| 2004/0208442 | A1 * | 10/2004 | Shi et al. | ........................ 385/34 |
| 2007/0036491 | A1 * | 2/2007 | Suzuki et al. | .................. 385/89 |

FOREIGN PATENT DOCUMENTS

| | | |
|---|---|---|
| JP | 62-269909 | 11/1987 |
| JP | 2004-62144 | 2/2004 |
| JP | 2004-133038 | 4/2004 |
| JP | 2005-4123 | 1/2005 |

* cited by examiner

*Primary Examiner*—Sung Pak
(74) *Attorney, Agent, or Firm*—Whitham, Curtis, Christofferson & Cook, PC

(57) ABSTRACT

In an optical tap module, a first lens, a focusing lens, and a photodiode are arranged such that a center axis of a cylindrical case housing the first lens, the focusing lens, and the photodiode is substantially located on the same line. When light propagates through a second optical fiber and is emitted from an end surface facing the first lens so as to be incident on an optical filter, and light transmitted the optical filter is converged by the focusing lens, the photodiode and a chip mounting support are arranged such that a focal point of light is located spatially distant from the surfaces of the photodiode and the chip mounting support.

17 Claims, 4 Drawing Sheets

OPTICAL TAP MODULE

BACKGROUND OF THE INVENTION

1. Field of the Invention

The present invention relates to an optical tap module which is used to monitor an optical signal in an optical fiber transmission line in a field of an optical communication or optical measurement.

2. Related Art

In an optical communication system or optical measurement system, in view of monitoring the system, the detection of presence/absence of signal light propagating through a transmission line, such as an optical fiber or the like, or its intensity is required. Further, when a device having an action, such as amplification or modulation, on signal light is used, signal light is monitored and the device gets the feedback action result. Such a monitoring function is basically implemented by branching off some of signal light from the transmission line through a branching unit having a predetermined branching ratio and by causing an optical detector to detect branched signal light.

As a unit for branching some of propagating light, for example, if light propagates through an optical fiber, a method is used in which the optical fiber is bent with a small radius of curvature, and some of light propagating through a core is extracted as leakage light, for example, by using a cut groove provided in a clad or the like. Further, if an optical waveguide includes an optical fiber, a method which uses a branched waveguide branched from the waveguide at a predetermined branching intensity ratio is used.

On the other hand, if light propagates through a space, a method is used in which an optical filter is used so as to transmit and extract propagating light. When the optical filter is used, by using a neutral density (ND) filter not having wavelength dependency as a filter, light can be extracted from signal light in a predetermined ratio. Besides, the ratio is constant, not depending on the wavelength. Such a branching unit is called an optical tap, and optical components constituting the optical tap are incorporated in a signal body, which is called an optical tap module. Further, an optical filter used in the optical tap is called a tap filter.

In an optical monitor (optical tap) disclosed in Japanese Patent Publication No. JP 2004-62144A, an input optical fiber and an output optical fiber face a tap filter such that their optical axes have a predetermined angle with respect to the tap filter, and a photodiode is disposed at the back of the tap filter as an optical detector. Light incident on the input optical fiber is reflected, for example, 95 to 99% by the tap filter and is coupled to the output optical fiber. The remaining 1 to 5% transmits the tap filter and reaches the photodiode. Therefore, optical intensity can be monitored, without causing optical signal intensity of propagating light to be significantly lowered.

In Japanese Patent Publication No. S62-269909A, a tap is disclosed in which two gradient index rod lenses face each other, and a tap filter is interposed therebetween. FIG. 1 shows a generalized optical system of the tap. This is a general optical system having a two-core optical fiber collimator, which uses a gradient index rod lens having a lens length of ¼ pitch (meandering cycle), and a focusing lens for converging light beams to the photodiode (in JP S62-269909A, a gradient index rod lens is used for the focusing lens).

Light propagating through the input optical fiber 101 is emitted from the end surface of the optical fiber as divergent light, and is converted into parallel light by the rod lens 102 to be incident on the tap filter 105. The tap filter 105 reflects most light (normally, 95 to 99%). Reflected light is converged by the rod lens 102, is coupled to the output optical fiber 103, and then returns to the transmission line. Light transmitted the tap filter 105 is converged by the focusing lens 104, and is incident on the photodiode 106 (hereinafter, the same parts are represented by the same reference numerals, and the descriptions thereof will be omitted).

One of important characteristics of such a tap module is unidirectional characteristic. The unidirectional characteristic means that only light incident from a predetermined direction is detected, and also indicates how much backward light from other directions can be removed. In recent years, the importance of the unidirectional characteristic is increasing accompanied by the spread of an optical amplifier and low cost. As an index representing unidirectional characteristic, directivity is used. The directivity is represented by a ratio of a current output Ipd1 of the photodiode when light is input from the input optical fiber and a current output Idp2 of the photodiode when light having the same intensity is input to the output optical fiber, and is defined by the following expression. As the directivity is increased, excellent unidirectional characteristic is obtained.

Directivity (dB)=10×log ($Ipd1/Ipd2$)

In an optical tap module having the unidirectional characteristic, light (signal light) incident from the input optical fiber transmits the tap filter to be coupled to the photodiode. On the other hand, light (backward light) propagating backward from the output optical fiber is not transmitted to the photodiode.

This is useful to monitor the intensity of incident light at the previous stage of the optical fiber amplifier. An erbium-doped optical fiber amplifier obtains a large gain with respect to signal light. In this case, however, amplified spontaneous emission (ASE) is emitted from the amplifier to an input side, as well as signal light. If a normal optical tap is used at the previous stage of the optical amplifier, since ASE is incident from an output-side of the optical tap, a background level of the photodiode output rises, and thus it is difficult to accurately measure the intensity of incident light.

As a method of improving the unidirectional characteristic, in general, the following method is used. As shown in FIG. 2A, it is assumed that, in a two-core optical fiber collimator 110 having the two parallel optical fibers 101 and 103, and the gradient index rod lens 102, the arrangement distance of the input optical fiber 101 and the output optical fiber 103 is d. Further, it is assumed that a distance between a focal point of a light beam 107 (indicated by a solid line), which transmits the focusing lens 104 and then is incident from the input optical fiber, and a focal point of a light beam 108 (indicated by a dashed line) (hereinafter, referred to as "light from the output optical fiber") when light is incident on the output optical fiber in the same direction as the input optical fiber) is D.

D can be adjusted by suitably selecting the focal distance of the focusing lens and the optical fiber distance d. By widening the distance D, as shown in FIG. 2B, if the light beam 107 from the input optical fiber 101 is aligned so as to be converged to an active area of the photodiode 106, even when backward light is incident from the output optical fiber 103, light can be converged outside the active area.

Table 1 shows examples of the design values when the gradient index rod lens is used as the focusing lens. Herein, a lens A has a lens length of 0.15 pitch, and a focal distance of 2.41 mm, and a lens B has a lens length of ¼ (0.25) pitch and a focal distance of 1.95 mm.

TABLE 1

| OPTICAL FIBER | FOCAL POINT DISTANCE D [µm] | |
| --- | --- | --- |
| DISTANCE d [µm] | LENS A | LENS B |
| 125 | 160 | 125 |
| 165 | 200 | 165 |
| 200 | 250 | 200 |
| 300 | 370 | 300 |

As described above, it can be understood that D can be made larger by using the gradient index rod lens having a short pitch. Actually, by incorporating an optical system having D larger than 120 µm and a general pin photodiode having a diameter of the active area of about 80 µm, the directivity of about 20 to 25 dB can be obtained.

However, in the related art, there are the following problems.

The directivity of the optical tap module required for the optical fiber amplifier is about 30 dB, and thus insufficient directivity is obtained in the configuration according to the related art.

Due to the following reasons, the directivity should be sufficiently made large. In general, the photodiode 106 is mounted on a nail pin 112 which serves as a chip mounting support having a wide front end, as shown in FIG. 2B (the diameter of the wide portion is 0.86 mm to the maximum). Assuming that the active area of the photodiode is designed to be at the center of the chip, if the size of a chip of the photodiode 106 is smaller than two times as much as the above-described distance D between the focal points of light, the focal point of light from the output optical fiber 103 is not located on the photodiode chip. However, if the wider portion of the nail pin 112 extends, the light beam 108 from the output optical fiber 103 may be irradiated onto the nail pin 112. Light irradiated onto and reflected and scattered by the nail pin may be reflected in a package 109 of the photodiode 106 and may be coupled to the photodiode 106 again as noise. As a result, the directivity is lowered.

When the incident light beam 107 from the input optical fiber 101 is irradiated onto the center of the active area of the photodiode 106, and the size of the chip of the photodiode 106 is larger than two times as much as the distance D between the focal points, the light beam 108 from the output optical fiber 103 is irradiated onto the chip, not necessarily onto the active area of the chip.

When a light-shielding film is provided in the chip, light irradiated onto the chip is reflected by the light-shielding film and becomes stray light. When the light-shielding film is not provided, light is absorbed outside the active area of the chip. However, some of generated electric carriers reaches the active area by diffusion and becomes noise. As a result, the directivity may be lowered.

In order to solve the above-described problems, the focal point distance D may be set large such that light from the output optical fiber 103 is not irradiated onto the nail pin 112 (FIG. 3). However, if doing so, the photodiode 106 should be located at a position distant from a center axis 120 of the lens. In general, when a lens having a circular circumference and the photodiode 106 are assembled as a module, preferably, the photodiode 106 is housed in a cylindrical container (package) 109, and the entire module is housed in a cylindrical case. However, when the photodiode 106 should be located at the position distant from the center axis 120 of the lens, the nail pin 112 is initially provided at the center of the package 109, and thus misalignment between the center of the package 109 and the center axis 120 of the lens occurs as shown in FIG. 3. In such a case, the alignment is difficult, and the entire module is rarely housed in the cylindrical case.

Further, when two rod lenses having ¼ pitch are used, a focus is formed on an end surface on the output side of a focusing rod lens. A distance needs to be provided between a focal surface and the photodiode, and light, which forms the focus on the lens end surface once, is widened again by that distance. For this reason, a photodiode having a large active area of photodetector needs to be provided. Accordingly, reflection easily occurs at the surface of the chip, and thus the directivity deteriorates.

In general, a component for optical communication which has small reflection feedback light is required, and the optical tap is no exception. In the optical tap, there is a problem in that light incident from the input optical fiber is reflected at the surface of each component and returns toward a light source.

SUMMARY OF THE INVENTION

The invention has been finalized in view of the problems inherent in the related art, and it is an object of the invention to provide an optical tap module which obtains large directivity, reduces feedback light reflectance, and realizes ease of alignment and assembling.

(1) First aspect of the invention provides an optical tap module comprising:

a first optical fiber and a second optical fiber disposed in parallel and apart from each other at a predetermined distance;

a first lens having a first end surface thereof arranged to face to end surfaces of the input and second optical fibers, and by which light emitted from the first optical fiber is collimated;

a second lens having a first end surface thereof facing to a second end surface of the first lens, an optical filter arranged to face to the second end surface of the first lens, the optical filter being configured to transmit a part of collimated light from the first lens and to reflect another part of the collimated light without having wavelength dependency; and a photodiode having an active area disposed to face to a second surface of the second lens, so that light emitted from the second lens is incident on the active area;

wherein the first lens and the second lens are integrated, interposing the optical filter therebetween, so that center axes of the first lens and the second lens are aligned with each other.

(2) According to the invention, the photodiode may be accommodated in a cylindrical package, and the package may be arranged so that a center axes of the package and the center axes of the first lens and the second lens are aligned with one another.

In the optical tap module according to the one aspect of the invention, the first lens and the second lens are integrally fixed with the optical filter interposed therebetween such that the center axes of both lenses are aligned with each other.

By doing so, an optical tap module which realizes ease of alignment and assembling can be provided.

(3) According to the invention, the photodiode may be arranged such that light which is emitted from the second optical fiber to be incident on the first lens and is transmitted through the optical filter to be converged by the second lens forms a focal point that is apart from a surface of the photodiode.

(4) According to the invention, the optical tap module may further comprises a chip mounting support on which the photodiode is mounted, and the chip mounting support may be arranged such that light which is emitted from the second optical fiber to be incident on the first lens from the second optical fiber and is transmitted through the optical filter to be converged by the second lens forms a focal point that is apart from a surface of the chip mounting support.

By doing so, even when backward light is incident from the second optical fiber, light is not irradiated onto the surfaces of the photodiode and the chip mounting support. Accordingly, reflected/scattered light can be prevented, and thus directivity can be improved.

(5) According to the invention, the optical tap module may further comprises a chip mounting support on which the photodiode is mounted, and the photodiode may be mounted such that a mounting surface of the chip mounting support is not exposed from an outer surface of the photodiode at least on a side with respect to the photodiode where light which is emitted from the second optical fiber to be incident on the first lens from the second optical fiber and is transmitted through the optical filter to be converged by the second lens forms a focal point that is apart from a surface of the chip mounting support.

By doing so, even when backward light is incident from the second optical fiber, light is not irradiated onto the surface of the chip mounting support. Accordingly, reflected/scattered light can be prevented, and thus the directivity can be improved.

(6) According to the invention, the first lens and the second lens may be gradient index rod lenses, and the second end surface of the second lens may be inclined, so that light which is emitted from the first optical fiber to be incident on the first lens and is transmitted through the optical filter to be converged by the second lens forms a focus point that is substantially on the center axis of the second lens.

In addition, in optical tap module according to the aspect of the invention, it is preferable that the first lens and the second lens be gradient index rod lenses, the light emitting surface of the second lens be inclined with respect to a surface perpendicular to the center axis of the lens, and a position where light incident from the first optical fiber and transmitted the optical filter is converged by the second lens so as to form a focus be substantially positioned on the center axis of the second lens.

By doing so, the photodiode can be arranged on the center axis of the lens, and thus ease of alignment and assembling can be realized.

(7) According to the invention, the first lens and the second lens may be gradient index rod lenses, and the second end surface of the second lens may be perpendicular to the center axis of the second lens, and the photodiode may be offset in the package so as to be disposed at a position where light emitted from the first optical fiber to be incident on the first lens and is transmitted through the optical filter to be converged by the second lens forms a focal point.

By doing so, even when backward light is incident from the second optical fiber, light is not irradiated onto the surface of the chip mounting support. Accordingly, reflected/scattered light can be prevented, and thus the directivity can be improved.

(8) According to the invention, the optical tap module may further comprises a chip mounting support on which the photodiode is mounted, and the photodiode may be mounted such that a mounting surface of the chip mounting support is not exposed from an outer shape of the photodiode at least on a side with respect to the photodiode where light which is emitted from the second optical fiber to be incident on the first lens from the second optical fiber and is transmitted through the optical filter to be converged by the second lens forms a focal point.

(9) According to the invention, when a distance between a first focal point at which light which is emitted from the second optical fiber to be incident on the first lens from the second optical fiber and is transmitted through the optical filter to be converged by the second lens forms the focal point, and a second focal point at which light which is emitted from the second optical fiber to be incident on the first lens from the second optical fiber and is transmitted through the optical filter to be converged by the second lens forms the focal point is D, a length of one side of the photodiode is L, and a diameter of the active area in the photodiode is A, a distance Z between the first focal point and a side surface of a chip mounting support of the photodiode located in a direction toward the second focal point as viewed from the first focal point may fall within a range represented by the following expression.

$$L/2 < Z < D - A/2$$

By doing so, even when backward light is incident from the second optical fiber, light is not irradiated onto the surface of the chip mounting support. Accordingly, reflected/scattered light can be prevented, and thus the directivity can be improved.

(10) A surface of the active area of the photodiode may be inclined with respect to a surface perpendicular to the center axis of the lens.

According to this configuration, the feedback of incident light to the first optical fiber can be reduced.

(11) Another aspect of the invention provides an optical tap module comprising a first optical fiber and a second optical fiber disposed in parallel and apart from each other at a predetermined distance;

a first gradient index lens having a first end surface thereof arranged to face to end surfaces of the input and second optical fibers, and by which light emitted from the first optical fiber is collimated;

a second gradient index lens having a first end surface thereof facing to a second end surface of the first gradient index lens, an optical filter arranged to face to the second end surface of the first gradient index lens, the optical filter being configured to transmit a part of collimated light from the first lens and reflect another part of the collimated light is reflected without having wavelength dependency; and a photodiode having an active area disposed to face to a second surface of the second lens, so that a light emitted from the second lens is incident on the active area;

wherein the second end surface of the second gradient index lens is inclined, so that light which is emitted from the first optical fiber to be incident on the first lens and is transmitted through the optical filter to be converged by the second lens forms a focus point that is substantially on a center axis of the second gradient index lens.

According to the configuration of the optical tap module of the invention, even when backward light from the second optical fiber is incident, light is not irradiated onto the surfaces of the photodiode and the chip mounting support, and thus reflected/scattered light from incident light is prevented. Therefore, the directivity of the tap module can be improved. Further, the invention can be applied to an optical tap module for an optical fiber amplifier.

Further, in the optical tap module of the invention, the first lens and the second lens are integrally fixed such that their center axes are aligned with each other, and thus the alignment and assembling can be easily performed. At this time, by causing the surface of the active area of the photodiode to be inclined with respect to the surface perpendicular to the center axis of the lens, feedback light reflectance can also be reduced.

In order to the above-described problems, according to the invention, an arrangement is made such that light from an second optical fiber is irradiated onto a photodiode mounting support member (pin), and thus reflected/scattered light from the support member is prevented.

DETAILED DESCRIPTION OF THE PREFERRED EMBODIMENTS

Figure 1:
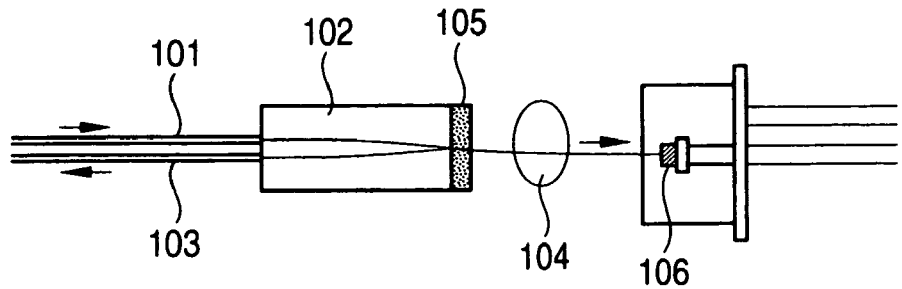
FIG. 1 is a diagram showing an optical system of a related art tap using an optical filter.
Figure 2A:
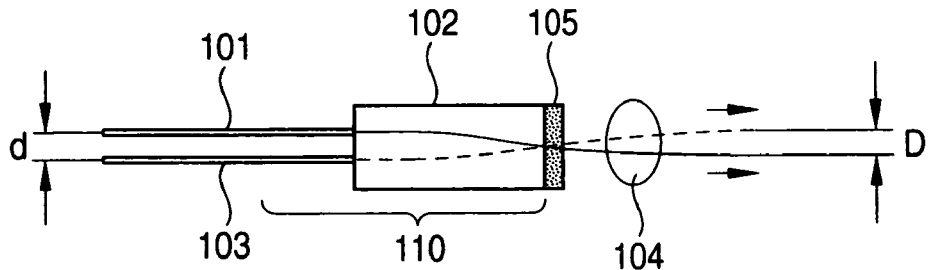
FIGS. 2A and 2B are diagrams illustrating the drawbacks inherent in the related art tap.
Figure 2B:
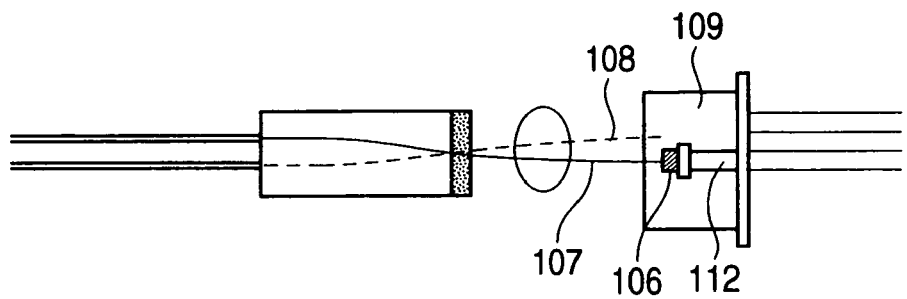
Figure 3:
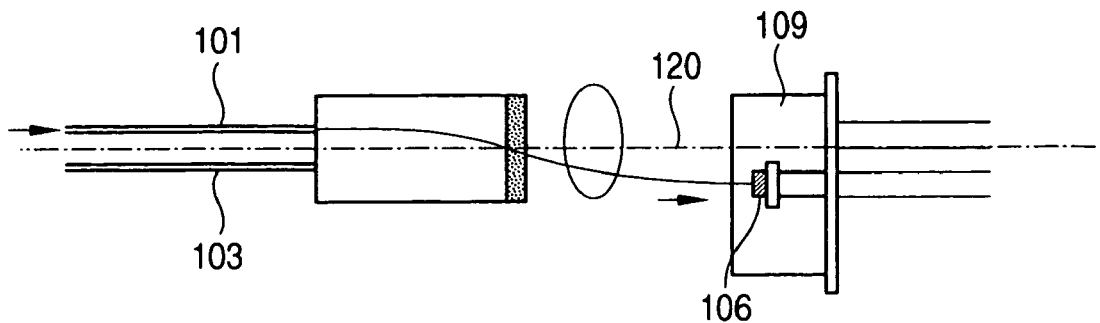
FIG. 3 is a diagram illustrating the drawbacks in assembling the related art tap.
Figure 4:
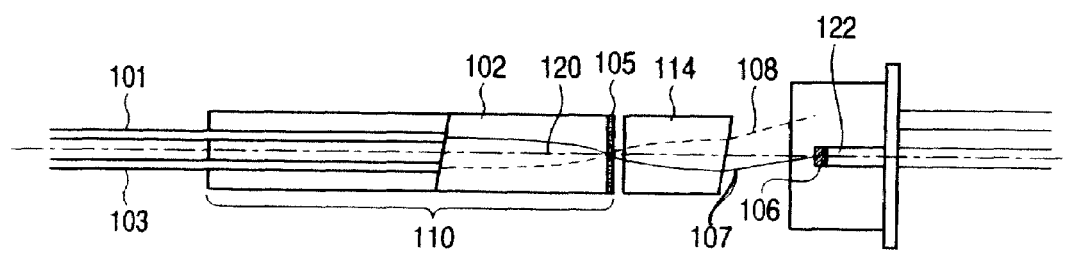
FIG. 4 is a diagram showing a configuration of a tap module according to the invention.

Specifically, as shown in FIG. 4, a unit for reducing the size of a pin 122, on which a photodiode 106 is mounted, can be provided. If the diameter of the pin 122, on which the photodiode 106 is mounted, is reduced, the pin is easily located out of a range in which light from an output optical fiber 103 (second fiber of the invention) is irradiated, and thus reflected/scattered light is prevented from occurring.

Simultaneously, preferably, the photodiode 106 is made as small as possible such that a light beam 108 from the output optical fiber 103 is not incident.

Moreover, in an optical system of FIG. 4, since the positions of end surfaces of two optical fibers 101 and 103 are offset from a center axis 120 of a collimator lens 102 (first lens of the invention), when emitted from the second lens, the position of a light beam is shifted from the center axis 120 of the lens, and the emission direction thereof is also inclined with respect to the center axis. Here, by performing angular polishing on the output side end surface of a converging gradient index rod lens 114, the light beam emitted from the lens can be refracted, and the focal point of a light beam 107 from an input optical fiber 101 (first optical fiber of the invention) can be substantially corrected to a position close to the center axis of the lens. Accordingly, the photodiode can be arranged on the center axis of the lens. However, the light beam 108 from the output optical fiber 103 is significantly offset.

Figure 5:
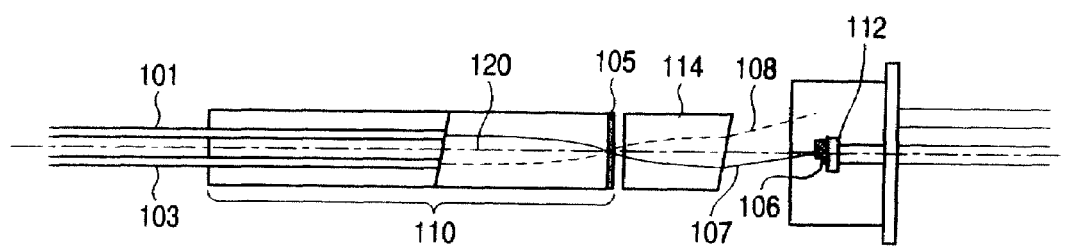
FIG. 5 is a diagram showing another configuration of a tap module according to the invention.

Further, as shown in FIG. 5, a unit for mounting the photodiode 106 at a position offset from the center of a nail pin 112 (aligned with the center axis 120 of the lens) can be provided. If the photodiode is offset from the center of the pin, the light beam 108 from the output optical fiber 103 is not irradiated onto the pin 112. For this reason, reflected/scattered light is prevented.

In FIG. 5, angular polishing is performed on the converging gradient index rod lens 114, and the beam offset from the input optical fiber 101 is corrected by using the gradient index rod lens 114, such that the pin 112 is arranged on the center axis 120 of the lens.

Figure 6:
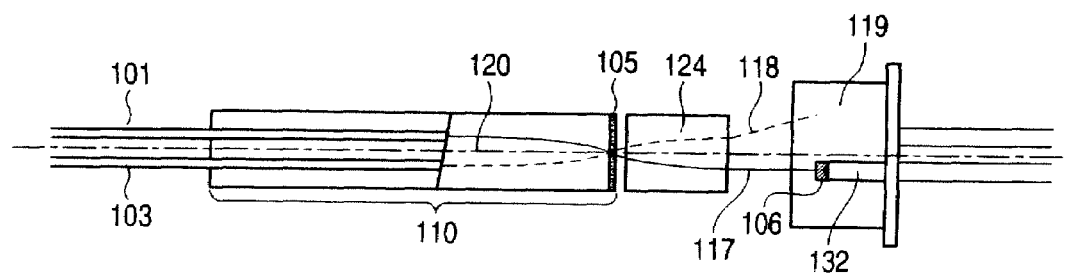
FIG. 6 is a diagram showing still another configuration of a tap module according to the invention.

In addition, as shown in FIG. 6, a pin 132 itself may be offset with respect to the center axis of a package 119 of the photodiode 106 having a cylindrical outer shape(aligned with the center axis 120 of the lens). In this case, angular polishing does not need to be performed on the end surface of a focusing lens 124 (second lens of the invention). If the position of the pin 132 is shifted from the center axis of the package 119 of the photodiode so as to be aligned with the position of a light beam 117 from the input optical fiber 101, a light beam 118 from the output optical fiber is not irradiated onto the pin 132. When the alignment is performed such that the light beam 117 is incident on the photodiode 106, the package 119 of the photodiode is not significantly shifted from the center axis 120, and thus the alignment or assembling is easily performed.

Of course, the pin 132, on which the photodiode 106 is mounted, needs to be reduced in size. Preferably, the chip itself is made as small as possible such that the light beam does not hit against the photodiode chip.

Figure 7:
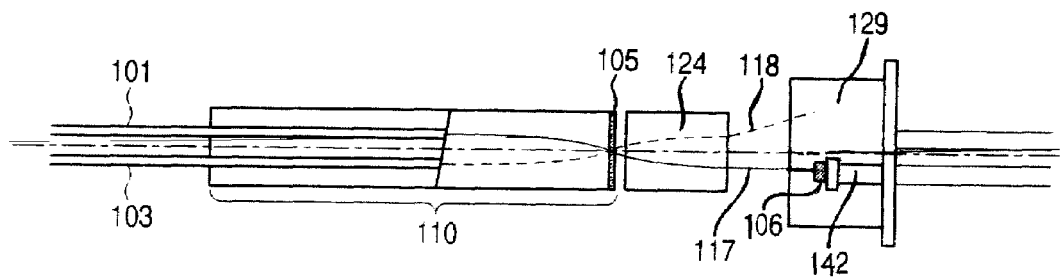
FIG. 7 is a diagram showing a further configuration of a tap module according to the invention.

Further, as shown in FIG. 7, a nail pin 142 may be disposed at a position shifted from the center of a package 129 of the photodiode 106, and the photodiode 106 may be mounted at a position offset from the center of the nail pin 142.

With any method described above, by studying a method of mounting a photodiode, or the position or shape of the pin, the light beam from the output optical fiber can be prevented from being irradiated to be reflected and scattered. As a result, directivity can be improved. Further, a large offset generated when the alignment of the lens and the photodiode is performed can be eliminated, and ease of assembling can be realized.

The above-described positional relationship will be described in detail.

Figure 8:
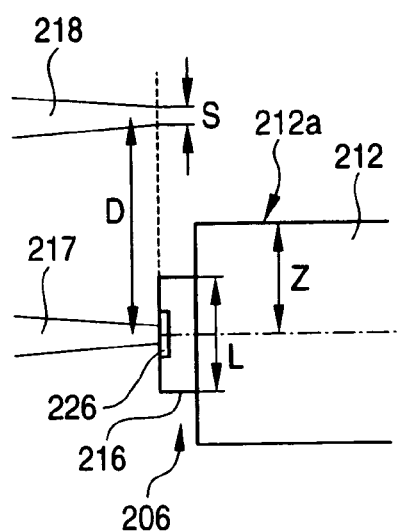
FIG. 8 is a diagram illustrating the positional relationship in the periphery of a photodiode of the tap module according to the invention.

As shown in FIG. 8, a side surface 212a of a pin 212, on which a photodiode 206 is mounted, is located so as to be spaced by a distance Z from a center position where a light beam 217 is incident on the photodiode 206 from the input optical fiber. When a focal point distance D of a beam spot is D, and the diameter of the beam spot is S, if Z is smaller than at least D−S/2, a light beam 128 from the output optical fiber is not incident on the side surface 212a of the pin 212.

On the other hand, when the size of a chip 216 of the photodiode 206 is a square shape of L×L, and the center of a portion 226 having responsivity is aligned with the center position of the rectangular shape, Z should be larger than at least L/2. However, the condition L/2<D should be satisfied.

From the above description, the range of Z becomes as follows.

$$L/2 < Z < D - S/2$$

Moreover, when the diameter of an active area 226 of photodetector in the photodiode 206 is A, the condition S<A is satisfied. Further, it is assumed that the position of an incident beam falls within the active area, the above-described expression S/2 is preferably substituted with A/2. That is, the following condition is preferably satisfied.

$$L/2 < Z < D - A/2$$

FIRST EXAMPLE

Figure 9:
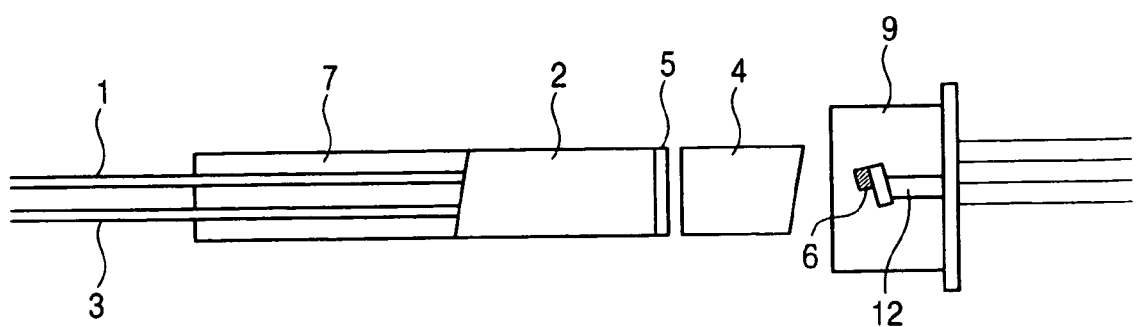
FIG. 9 is a diagram showing the configuration of a first example of a tap module according to the invention.

FIG. 9 shows a unidirectional tap module according to a first example of the invention. Light emitted from an optical fiber 1 for incident light is incident on a gradient index rod lens 2. The gradient index rod lens 2 is manufactured to have 0.25 pitch (meandering cycle) with respect to a used wavelength band, and is designed such that incident light from the optical fiber is emitted as parallel light. Parallel light emitted from the rod lens 2 is incident on an optical filter (tap filter) which is directly formed on an end surface of the rod lens as a thin-layered optical functional element. The filter 5 is designed to have reflectance of 95% and transmittance of 5%.

Light reflected by the filter 5 is converged by the rod lens 2 again and is incident on an output optical fiber 3. On the other hand, transmitted light from the filter 5 is converged by a second gradient index rod lens (focusing lens) 4 of 0.12 pitch, and is incident on a photodiode 6. Further, the emitting surface of the rod lens 4 is subjected to angular polishing, and the collection position of light from the optical fiber 1 for incident light is corrected to be located on the center axis of the rod lens 4. The photodiode 6 is mounted on a nail pin 12 located at the center of a package 9 such that the center of a photodetecting portion of the photodiode 6 is offset by about 200 μm in a direction from the center of the nail pin to a position where light from the output optical fiber 3 is converged.

Here, as the optical fibers 1 and 3, a normal single mode optical fiber having a clad diameter of 125 μm was used. A two-core capillary 7 is formed of glass, and the optical fibers 1 and 3 are held such that the inter-center distance of the optical fibers 1 and 3 is almost 250 μm. In this case, the distance D between the two focal points is about 370 μm. The photodiode 6 is a pin type having a light absorbing layer of InGaAs. Further, a diameter of active area of photodetector is 80 μm, and the diagonal size of the chip is 240 μm.

At the time of assembling, the position of the package 9 was aligned and fixed with respect to the rod lens 4 such that the maximum output of the photodiode 6 is obtained when light is incident from the optical fiber 1 for incident light and the minimum output is obtained when light is incident from the output optical fiber 3. In the related art, when the optical system having the two-core collimator and the focusing lens, and the photodiode are aligned with each other, the offset is 300 to 500 μm. In contrast, according to the configuration of the invention, the offset was about 200 μm, and thus the offset can be suppressed from being drastically lowered.

Moreover, the surface of the active area of the photodiode was inclined from the surface perpendicular to the center axis of the lens, such that incident light reflected at the surface of the photodiode was prevented from returning to the input optical fiber. In this example, as shown in FIG. 9, the nail pin 12 having an inclined chip mounting surface was used, and the chip was obliquely fixed by 8°. Alternatively, the entire package 9 may be obliquely assembled.

Figure 10:
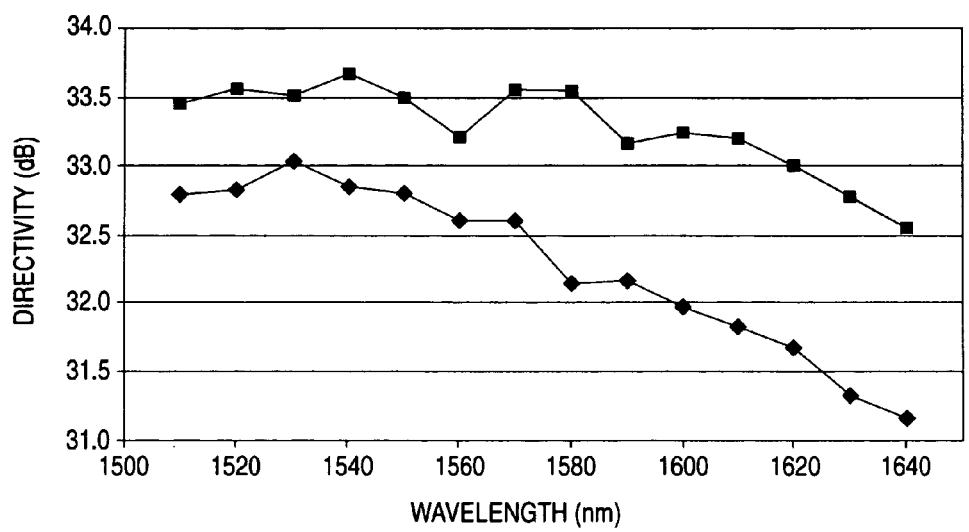
FIG. 10 is a diagram showing characteristics of the first example.

For the manufactured module, the directivity was measured. The ratio of the current output from the photodiode on light incident from the input optical fiber and the current output when light having the same intensity is incident from the optical fiber from emergent light was defined as the directivity, and wavelength dependency thereof was measured. FIG. 10 shows the result. Due to the wavelength dependency of the filter and the photodiode, the directivity also exhibited the wavelength dependency. However, the directivity of 31 dB or more could obtain in the measured wavelength range, and the improvement of 5 dB or more could be obtained, as compared with the related art unidirectional tap module.

Further, the feedback light reflectance was −55 dB, and the improvement of 10 dB or more could be obtained, as compared with the surface of the active area of the photodiode is perpendicular to the center of the lens.

SECOND EXAMPLE

Figure 11:
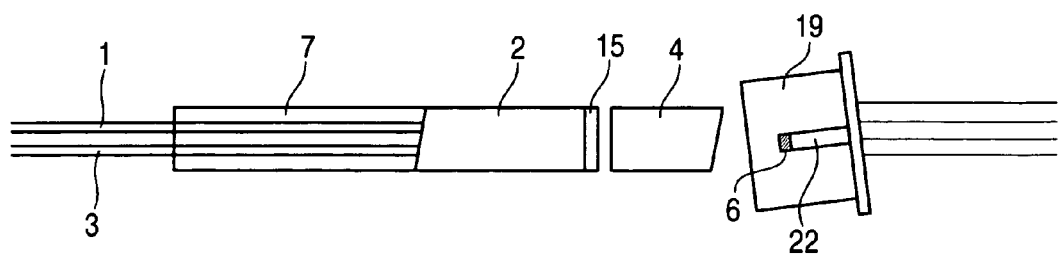
FIG. 11 is a diagram showing the configuration of a second example of a tap module according to the invention.

FIG. 11 shows of a unidirectional tap module according to a second example of the invention. The optical fibers 1 and 3, the two-core capillary 7 supporting the optical fibers 1 and 3, the rod lenses 2 and 4 are the same as those in the first example. However, the tap filter 15 was designed to have reflectance of 99% and transmittance of 1%. As a pin 22, on which the chip of a package 19 was mounted, a straight pin, not a normal nail pin, was used. The diameter of the pin 22 was 0.45 mm. The chip of the photodiode 6 had the diagonal size of 240 μm, like the first example.

The chip was mounted on the end surface of the pin 22. In this example, as shown in FIG. 11, the entire package 9 of the photodiode was obliquely fixed by 8° so as to reduce reflection feedback light. If the surface of the pin is processed obliquely, and the chip is mounted, the package does not need to be inclined.

When the directivity of the module was measured, the same result as the first example was obtained. Further, the feedback light reflectance was the same.

What is claimed is:

1. An optical tap module comprising:
    a first optical fiber and a second optical fiber disposed in parallel and apart from each other at a predetermined distance;
    a first lens having a first end surface thereof arranged to face to end surfaces of said input and second optical fibers, and by which light emitted from said first optical fiber is collimated;
    a second lens having a first end surface thereof facing to a second end surface of said first lens,
    an optical filter arranged to face to said second end surface of said first lens, said optical filter being configured to transmit a part of collimated light from said first lens and to reflect another part of the collimated light without having wavelength dependency; and
    a photodiode having an active area disposed to face to a second surface of said second lens,
    whereby light from said first optical fiber emitted from said second lens is incident on said active area and light from said second optical fiber emitted from said second lens is directed away from said photodiode;
    wherein said first lens and said second lens are integrally fixed, interposing said optical filter therebetween, so that center axes of said first lens and said second lens are aligned with each other.

2. The optical tap module according to claim 1, wherein said photodiode is accommodated in a cylindrical package, and said package is arranged so that a center axes of said package and the center axes of said first lens and said second lens are aligned with one another.

3. The optical tap module according to claim 1, wherein said photodiode is arranged such that light which is emitted from said second optical fiber to be incident on said first lens and is transmitted through said optical filter to be converged by said second lens forms a focal point that is apart from a surface of said photodiode.

4. The optical tap module according to claim 1, further comprising a chip mounting support on which said photodiode is mounted, wherein said chip mounting support is arranged such that light which is emitted from said second optical fiber to be incident on said first lens from said second optical fiber and is transmitted through said optical filter to be converged by said second lens forms a focal point that is apart from a surface of said chip mounting support.

5. The optical tap module according to claim 1, further comprising a chip mounting support on which said photodiode is mounted, wherein said photodiode is mounted such that a mounting surface of said chip mounting support is not exposed from an outer surface of said photodiode at least on a side with respect to said photodiode where light which is emitted from said second optical fiber to be incident on said first lens from said second optical fiber and is transmitted through said optical filter to be converged by said second lens forms a focal point that is apart from a surface of said chip mounting support.

6. The optical tap module according to claim 1, wherein said first lens and said second lens are gradient index rod lenses,
said second end surface of said second lens is inclined, so that light which is emitted from said first optical fiber to be incident on said first lens and is transmitted through said optical filter to be converged by said second lens forms a focus point that is substantially on the center axis of the second lens.

7. The optical tap module according to claim 2, wherein said first lens and said second lens are gradient index rod lenses,
said second end surface of the second lens is perpendicular to the center axis of said second lens, and
said photodiode is offset in said package so as to be disposed at a position where light emitted from said first optical fiber to be incident on said first lens and is transmitted through said optical filter to be converged by said second lens forms a focal point.

8. The optical tap module according to claim 7, further comprising a chip mounting support on which said photodiode is mounted,
wherein said photodiode is mounted such that a mounting surface of said chip mounting support is not exposed from an outer shape of said photodiode at least on a side with respect to said photodiode where light which is emitted from said second optical fiber to be incident on said first lens from said second optical fiber and is transmitted through said optical filter to be converged by said second lens forms a focal point.

9. The optical tap module according to claim 1, wherein when a distance between a first focal point at which light which is emitted from said second optical fiber to be incident on said first lens from said second optical fiber and is transmitted through said optical filter to be converged by said second lens forms the focal point, and a second focal point at which light which is emitted from second optical fiber to be incident on said first lens from said second optical fiber and is transmitted through said optical filter to be converged by said second lens forms the focal point is D, a length of one side of the photodiode is L, and a diameter of the active area of the photodiode is A, a distance Z between the first focal point and a side surface of a chip mounting support of said photodiode located in a direction toward said second focal point as viewed from said first focal point falls within a range represented by the following expression $L/2 < Z < D - A/2.$ 10. The optical tap module according to claim 1, wherein a surface of the active area of the photodiode is inclined with respect to a surface perpendicular to the center axis of the lens.

11. An optical tap module comprising:
a first optical fiber and a second optical fiber disposed in parallel and apart from each other at a predetermined distance;
a first gradient index lens having a first end surface thereof arranged to face to end surfaces of said input and second optical fibers, and by which light emitted from said first optical fiber is collimated;
a second gradient index lens having a first end surface thereof facing to a second end surface of said first gradient index lens,
an optical filter arranged to face to said second end surface of said first gradient index lens, said optical filter being configured to transmit a part of collimated light from said first lens and reflect another part of the collimated light is reflected without having wavelength dependency; and
a photodiode having an active area disposed to face to a second surface of said second lens, so that a light emitted from the second lens is incident on said active area;
wherein said second end surface of said second gradient index lens is inclined, so that light which is emitted from said first optical fiber to be incident on said first lens and is transmitted through said optical filter to be converged by said second lens forms a focus point that is substantially on a center axis of said second gradient index lens.

12. The optical tap module according to claim 11, wherein said photodiode is accommodated in a cylindrical package, and said package is arranged so that a center axes of said package and the center axes of said first gradient index lens and said second gradient index lens are aligned with one another.

13. The optical tap module according to claim 11, wherein light which is emitted from said second optical fiber to be incident on said first lens and is transmitted through said optical filter to be converged by said second lens forms a focal point that is apart from a surface of said photodiode.

14. The optical tap module according to claim 11, further comprising a chip mounting support on which said photodiode is mounted, wherein said chip mounting support is arranged such that light which is emitted from said second optical fiber to be incident on said first gradient index lens from said second optical fiber and is transmitted through said optical filter to be converged by said second gradient index lens forms a focal point that is apart from a surface of said chip mounting support.

15. The optical tap module according to claim 11, further comprising a chip mounting support on which said photodiode is mounted, wherein said photodiode is mounted such that a mounting surface of said chip mounting support is not exposed from an outer surface of said photodiode.

16. The optical tap module according to claim 11, wherein when a distance between a first focal point at which light which is emitted from said second optical fiber to be incident on said first gradient index lens from said second optical fiber and is transmitted through said optical filter to be converged by said second gradient index lens forms the focal point, and a second focal point at which light which is emitted from said second optical fiber to be incident on said first lens from said second optical fiber and is transmitted through said optical filter to be converged by said second gradient index lens forms the focal point is D, a length of one side of the photodiode is L, and a diameter of the active area of the photodiode is A, a distance Z between the first focal point and a side surface of a chip mounting support of said photodiode located in a direction toward said second focal point as viewed from said first focal point falls within a range represented by the following expression $$L/2 < Z < D - A/2.$$

17. The optical tap module according to claim 11, wherein a surface of the active area of the photodiode is inclined with respect to a surface perpendicular to the center axis of the lens.

\* \* \* \* \*